Sept. 21, 1926.  S. BAALSRUD ET AL  1,600,919

MOUNTING FOR THE SUSPENSION OF PICTURES AND OTHER OBJECTS

Filed April 14, 1925

Patented Sept. 21, 1926.

1,600,919

UNITED STATES PATENT OFFICE.

SIGURD BAALSRUD AND NILS BAALSRUD, OF OSLO, NORWAY.

MOUNTING FOR THE SUSPENSION OF PICTURES AND OTHER OBJECTS.

Application filed April 14, 1925. Serial No. 23,025.

The present invention has for its object to provide a simple and reliable device for the suspension of pictures and other articles, said device providing for a certain adjustability, whereby the article may be easily brought to occupy the correct or desired position.

Figure 1:
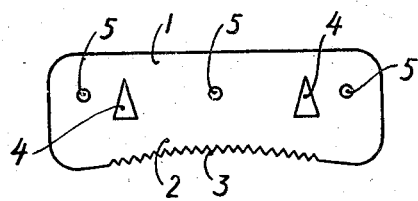
Figure 2:
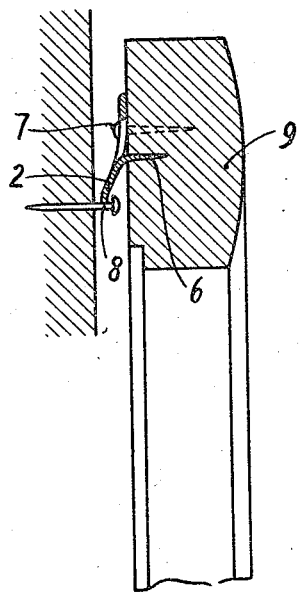

A suitable constructional form of the device is illustrated in the accompanying drawing, wherein Figure 1 is an elevation of the device, and Figure 2 is a cross sectional view of the device and part of a picture showing the device in use.

The device consists of a mounting plate 1, the portion 2 of which is bent somewhat out from the plane of the plate as clearly seen from Figure 2. The lower edge or only the central part thereof is provided with teeth 3 following preferably a slightly curved line such as a circular arc.

The plate 1 may be attached to a picture frame 9 or the like by some suitable means such as screws or nails 7 passed through holes 5 made in the plate or by means of sharp prongs 6 projecting from one side of the plate arm adapted to be forced into the frame material 9 at its rear side. The said prongs preferably are produced by stamping them out from the body of the plate 1 along two intersecting lines and bending out the triangular parts thus formed as clearly seen at 4 of Figure 1 showing the said prongs before their bending out perpendicularly to the plane of the plate.

In some cases we may use the holes 5 and nails 7 only, in other cases we use the prongs 6 only, and in still other cases it is suitable to use both fastening means 5, 7 and 6, depending upon the material of the frame, the weight and size of the picture or other object to be suspended by means of the device. In case the frame 9 is of metal, we use screws instead of nails 7. The number of holes 5 and prongs 4 may of course be varied. We may also dispense with holes 5 and prongs 6 by attaching the mounting to the frame 9 by solder.

A nail or screw 8 is used to carry the object to be suspended. This nail 8 is forced into the wall or other supporting part so as to project a certain short distance from the wall (see Figure 2). Also a hook or a special mounting may be used instead of the nail or screw 8.

After having attached the plate 1 to the picture frame 9 etc. and forced in the carrying element 8, the picture may be suspended in its position upon the wall by simply hanging the toothed plate portion 2 upon the nail 8, whereby the latter will project between two adjacent teeth 3. If now the picture should prove to hang incorrectly, it may be easily adjusted by displacing the toothing 3 relatively to the nail 8. When so adjusted the picture will remain safely in proper position, because the teeth will prevent any sliding motion of the picture or mounting on the nail 8, and the head or hook of the nail prevents the frame from sliding out from the wall.

In ordinary cases one device will be sufficient for each picture, it being attached at the middle of the upper side of the frame. But in some cases, especially if the picture etc. is very heavy, we may prefer to use two devices.

Having now particularly described and ascertained the nature of our said invention and in what manner the same is to be performed we declare what we claim is:

1. A device for the suspension of pictures or other objects consisting of a plate, a lower edge portion of same projecting out from the plane of the plate, a toothing forming part of the downwardly projecting edge of said portion, said toothing being curved slightly upwards, prongs stamped out from the plate for attaching it to the rear side of the object to be suspended, and holes bored through the plate for fastening purposes.

2. A device for the suspension of pictures or other objects consisting of a plate, a lower edge portion of same projecting out from the plane of the plate, a toothing forming part of the downwardly projecting edge of said portion, said toothing being curved slightly upwards, and holes bored through the plate for fastening purposes.

In witness whereof we affix our signatures.

SIGURD BAALSRUD.
NILS BAALSRUD.